Figure 1:
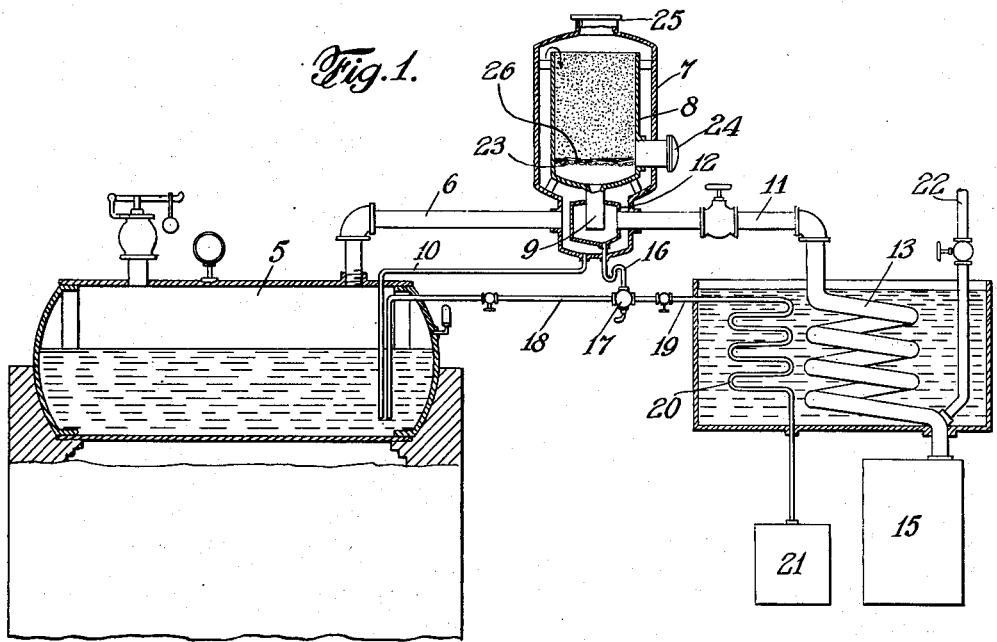

May 20, 1930.　　　　T. T. GRAY　　　　1,759,812

METHOD FOR PURIFYING HYDROCARBON COMPOUNDS

Filed Sept. 26, 1923　　2 Sheets-Sheet 1

INVENTOR
Thomas T. Gray
BY
Kenyon & Kenyon
ATTORNEYS

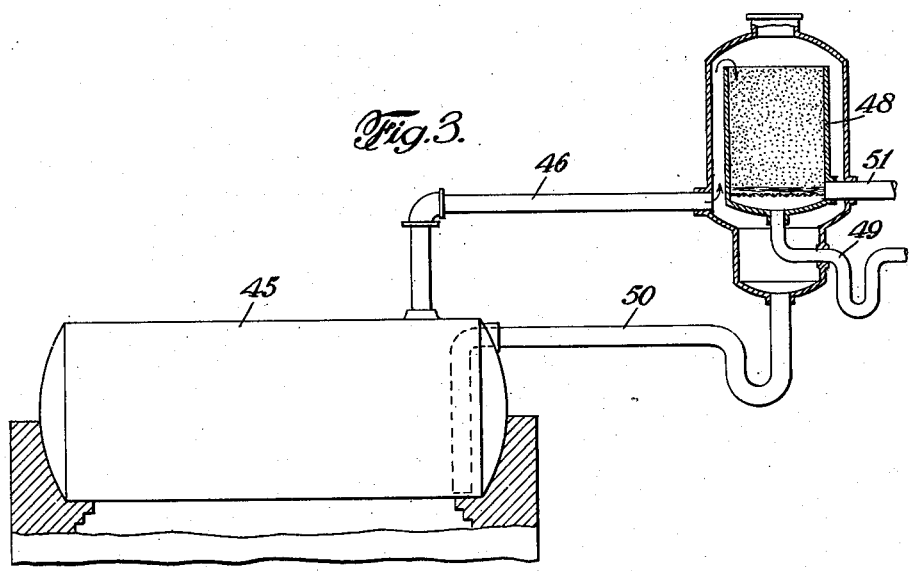
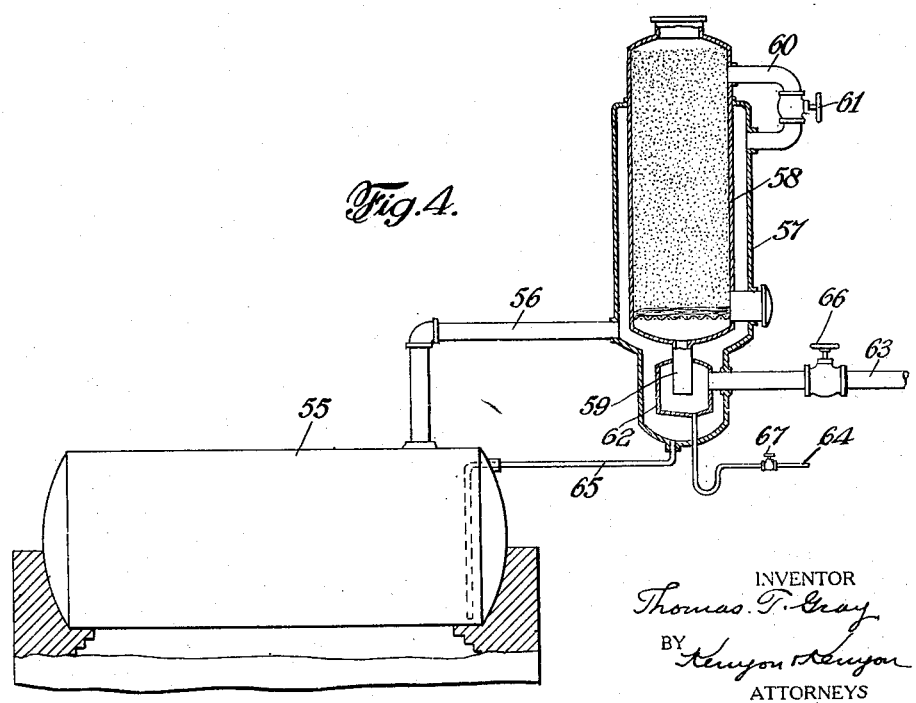

Patented May 20, 1930

1,759,812

UNITED STATES PATENT OFFICE

THOMAS T. GRAY, OF ELIZABETH, NEW JERSEY, ASSIGNOR TO THE GRAY PROCESSES CORPORATION, A CORPORATION OF DELAWARE

METHOD FOR PURIFYING HYDROCARBON COMPOUNDS

Application filed September 26, 1923. Serial No. 664,893.

This invention relates to the treatment of hydrocarbon compounds and the like particularly in the refining thereof, to produce stable commercial liquids of good odor and permanent color or water white color. It is capable of use in connection with many substances, a particularly important use being in relation to the refining of gasoline, motor fuel, and other fractions produced from heavy oils by cracking.

Objects of my invention are to provide a simple and efficient process for subjecting vapors to the action of a catalyst under circumstances most favorable for effective catalytic action, either in connection with a separate distillation process or as a part of an original distillation or cracking process. As applied to the production of gasoline or burning oils, by cracking, my invention makes it possible to obtain a high yield that is of good odor, stable water-white color, and that is free from the objectionable constituents that result from the use of other purifying systems.

At the present time, the gasoline, naphtha or benzine fractions existing naturally in crude petroleum do not require treatment after distillation in order to make them commercially satisfactory, unless they are unstable or happen to contain a relatively high amount of sulphur, in which case the usual practice is to treat these fractions in the common way with sulphuric acid followed by an alkaline solution of sodium plumbite. But with the extension of the use of the cracking process to produce similar fractions, new problems of purification have arisen for which various solutions have been offered. The cracked hydrocarbon distillates resulting from the distillation of heavy oils at high temperatures, while generally colorless when fresh, contain unsaturated hydrocarbons not present in the original material treated, or in the crude petroleum from which the original material treated was obtained. Certain of these hydrocarbons are very unstable, possessing the property of combination between themselves to form new compounds of considerably higher boiling point, called polymers, and the process of this combination is termed polymerization. Under ordinary circumstances polymerization takes place slowly. It effects discoloration of the liquid and forms compounds that will produce a deposit of heavy dark solid or semi-solid material. Before cracked hydrocarbon distillates are ready for the market, therefore, some further treatment is necessary. The usual commercial method has been treatment by sulphuric acid. Numerous disadvantages result from such treatment. First, there is a loss in volume due to combination of parts of the material with the acid in forming sludge acid. Next, there is a loss in low-boiling compounds of the sort desired to be attained by the treatment, probably because of polymerization induced by the presence of the acid. Further, the acid reacts with certain of the hydrocarbons to form esters which are not removed by later washings and which break down on combustion in a motor with the liberation of sulphur dioxide which is very corrosive to the piston heads and cylinder walls. Finally, the acid treatment is difficult and dangerous and expensive to carry on and produces offensive waste products.

I have found that improved purification of such compounds may be accomplished by passing the vapors of distillation through a catalyst such as fuller's earth, bone-black, bauxite, kieselguhr, infusorial earth, or other solid adsorbent material, or the like, while the same is at a temperature substantially the same as that of the vapors. A reaction, which may be exothermic, thereupon takes place in the presence of the catalyst. Certain of the unstable and objectionable compounds in the vapors interact to form other compounds, some or all of which are of substantially higher boiling point than the temperature of the catalyst for they condense in the catalyst thereby forming a liquid which may be separated from the vapors. The new compounds so liquefied are called polymers. I preferably return them to the still for redistillation but they may be handled as hereinafter described. The vapors which emerge from the catalyst are separated in any appropriate manner from the liquids or polymers and pass to a condenser where they produce finished products of improved odor, water-white color, not contaminated by any of the objectionable constituents occurring in the product of the acid treatment, and free of objectionable unstable constituents. The desirable low-boiling compounds which would have been removed in the acid treatment, as above stated, are not removed during treatment in accordance with my invention but appear in the condensate of the vapors. My invention accordingly results in selective polymerization by removing the objectionable unstable unsaturates without affecting the unobjectionable constituents of the vapors. The polymers formed in the operation of my invention frequently resemble lubricating oils in physical tests but their iodine absorption is considerably in excess of that of ordinary lubricating oil. They frequently have a boiling point considerably higher than that of the highest boiling fraction of the material being treated, thus indicating that they could not have existed in the material being treated and that they must constitute a new composition of matter resulting from the process.

A comparison of certain features of old purifying processes with the process of purification above set forth makes the latter clearer and more definite. The dark colored mineral oils which were producel by processes of distillation practiced shortly after the finding of petroleum in commercial quantities are evidently similar to those reduced oils which are at present filtered in the liquid state through fuller's earth to effect decolorization in the production of lubricating oils of red or pale amber color. Such oils did not contain the objectionable unsaturated constituents that are found in distillates produced by present cracking processes. The exact composition of the coloring matter eliminated is not known but it is asphaltic in its physical characteristics and solid at ordinary temperature. The coloring matter removed from such oils through treatment in the liquid phase as described is retained by the fuller's earth thereby indicating that it cannot be extracted from fuller's earth by such oil under these conditions. Such coloring matter can be partly removed from the fuller's earth by extraction with ether, benzene and alcohol and can be completely removed by acidified alcohol. However, the introduction of cracking processes has produced distillates entirely different in character from products known in those earlier stages of the art of petroleum treatment. Such distillates contain highly unstable, unsaturated hydrocarbons that do not exist in crude petroleum. There is a general belief that the unstable, unsaturated hydrocarbons that occur in such distillates are diolefins and it is the unstable characteristic of these hydrocarbons that renders them objectionable. It is these unstable constituents that darken upon exposure to light, that oxidize to form compounds containing an aldehydic group and that deposit solid colored matter. The cracked distillates are of very light color, gasoline produced by cracking usually being colorless, and nothing would be gained by treating them in their liquid state with fuller's earth for decolorization purposes. The objection to such distillates is not in the color of the original product but lies in the re-activity of the objectionable, unstable, unsaturated compounds that give offensive odors and form deposits in storage and carburetting apparatus and as to burning oils char wicks of lamps. The catalyst herein referred to causes reaction within the vapors produced by cracking distillation and effects formation of color producing compounds and thereafter effects their removal, while treatment of the distillate in its liquid state would have accomplished nothing.

A characteristic of the present invention is that the polymers separated out of the vapors by the action of the catalyst may contain more dark coloring matter in the aggregate than was present in the vapors just prior to their coming in contact with the catalyst, thus indicating that new hydrocarbon compounds have been formed in the process. A part of this dark coloring matter may be held in the catalyst (if it have sufficient adsorptive power, as in the case of fuller's earth) while the remainder is carried off with the liquid polymers.

In my patent, No. 1,340,889, granted May 25, 1920, I show a process and apparatus for treating petroleum hydrocarbons in which the vapors are passed through a catalyst of fuller's earth or the like having a temperature substantially the same as that of the entering vapors, and I also show how, when circumstances or the substance being treated require it, heat may be supplied to the catalyst by the use of steam, fire or other source of extrinsic heat. This patent discloses and broadly claims the fundamental invention of vapor phase refining of hydrocarbons containing unstable, unsaturated compounds such for example as cracked hydrocarbons by contact action with solid adsorbent material such as fuller's earth. But it does not disclose any means for preconditioning the vapors themselves so as to permit most efficient polymerization of the unstable unsaturates. It does not disclose a continuous process throughout the efficient life of the catalyst. It does not disclose means for separating the liquids including polymers formed in the process from the refined vapors nor for contacting the vapors under pressure. In my present invention I provide numerous advantages any one or more of which may be combined with the generic process of my prior patent to achieve important new results, such advantages including the automatic temperature control of the catalyst, conditioning of the vapors for more efficient polymerization by removal of the higher boiling constituents thereof before contact with the catalyst, continuous treatment of the vapors by providing means for continuous removal of the polymers and other liquids formed in the catalyst and continuous separation thereof from the vapors without the necessity of redistillation. It will be understood that my invention is not limited to any one of these advantages or to the combination of all of them.

In my present invention I preferably condition the vapors for more effective polymerization by dephlegmating or fractionally condensing the vapors between the cracking or distilling stage and the polymerizing or refining stage so that the entrained liquids and high-boiling constituents are removed before contact with the catalyst. This conditioning of the vapors greatly improves the resulting polymerization; it avoids the clogging and poisoning of the catalyst by high-boiling liquids and by the relatively large yield of polymers formed from the reaction of the high-boiling vapors in the presence of the catalyst; it permits greater surface contact between the low-boiling vapors and the catalyst and so permits greater adsorptive activity between the catalyst and the low-boiling vapors; and it increases the efficient life of the catalyst by admitting to contact with it only the more easily treatable constituents of the vapors. Though my process permits polymerization of high-boiling as well as low-boiling vapors I have found that where the high-boiling and low-boiling vapors are treated simultaneously the high-boiling vapors tend to polymerize more rapidly and thus rapidly clog and poison the catalyst and that the low-boiling vapors are more effectively polymerized if they are brought into contact with the catalyst after the relatively high-boiling constituents have first been removed. In a batch distillation, this is true with respect to each succeeding cut or fraction of the vapors coming from the cracking unit or still. By my invention the treatment of each such fraction is accordingly effective. The resultant output of refined product per ton of catalyst and the effective life of the catalyst are notably increased.

I preferably provide for continuous treatment of the entering vapors throughout the efficient life of the catalyst by causing the liquids formed in the catalyst to be continuously drawn off and removed therefrom so that the flow of vapors through the polymerizer is never cut off by the formation of a liquid seal therein and the surface of the catalyst in the polymerizer is maintained in condition for adsorptive contact with the vapors. I likewise provide for continuous separation of the vapors from the liquids so that the stream of refined vapors flowing out of the polymerizer is kept free of contamination by the high-boiling liquids formed in the catalyst.

By preferably depending upon the heat of the vapors themselves to maintain the catalyst at a temperature such as to condense the polymers while retaining the desired product in vapor phase, I avoid the mechanical difficulties and expense of a complicated piping and heating system when circumstances require heating of the catalyst and I insure the automatic maintenance of the catalyst at the temperature of the vapors without attendance or adjustment or special mechanism. The temperature of the catalyst varies with that of the vapors, and a more desirable product is obtained than by the use of extrinsic heat and by vastly simplified means. It will likewise be apparent that my invention makes possible throughout the efficient life of the catalyst the continuous treatment of the entering vapors, the continuous polymerization of the objectionable unstable unsaturated compounds therein, the continuous removal of the polymers from the catalyst and separation of the refined vapors from the liquid product formed in the catalyst without further processing or redistillation. The process may be carried on either in connection with a rerun still employing cracked distillates as charging stock or it may be employed in direct connection with any cracking process employing gas or fuel oil or the like as charging stock and the polymerizer may advantageously be operated under super-atmospheric pressure. When operated in direct connection with the pressure system the vapors may be expanded or partially expanded through the catalyst or they may be maintained under pressure in the polymerizer.

Figure 2:
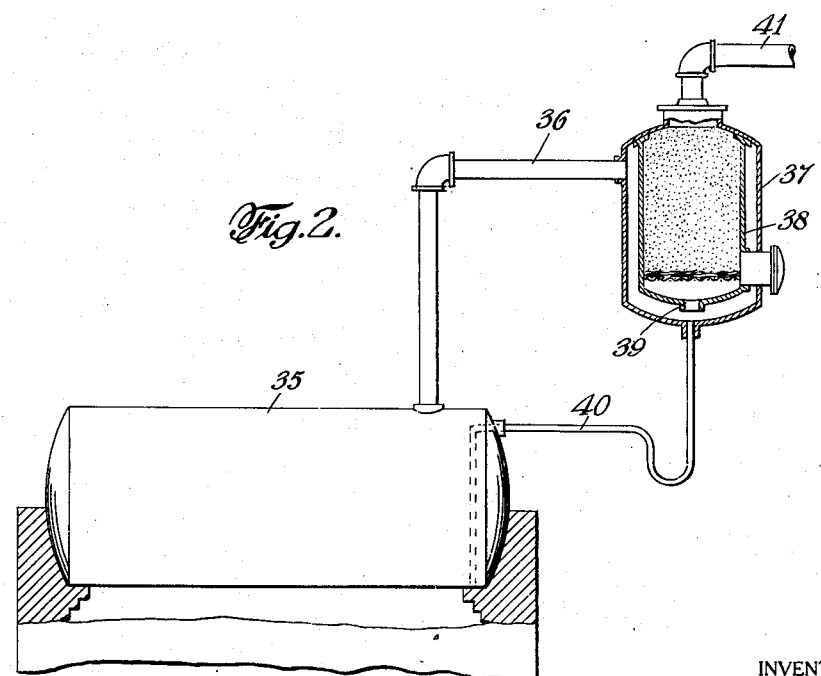

Suitable forms of apparatus for carrying on my invention are shown in the accompanying drawings in which: Fig. 1 is a vertical elevation, partly in section, of an apparatus embodying one form of my invention and adapted to carry on my process; Fig. 2 is a partial view of a modified form of the same; and Figs. 3 and 4 are partial views of other modifications of the same.

Referring to Fig. 1, the pressure still 5, set in brickwork, is heated by fire or otherwise in the usual manner. It is connected by vapor line 6 to a port near the bottom of the dephlegmator tower 7. Within the dephlegmator is mounted a container 8 which is open at the top, thereby communicating with the interior of the dephlegmator, and is provided at its bottom with a restricted neck portion 9 which communicates with a separating chamber 12 mounted within the lower portion of the dephlegmator. A return line 10 leads from the foot of the dephlegmator to the still 5. A second vapor line 11 leads from a point above the bottom of the separating chamber 12 to the usual condenser 13 and tank 15. A pipe 16 leads from the foot of the chamber 12 to a three-way valve 17, from which one connection, 18, leads back to the still and the other, 19, to a cooler, 20, and tank, 21. A vent pipe, 22, may be provided for separating the fixed gases from the condensate at the foot of the condenser. Valves may be provided for the pipes, 11, 18, 19 and 22. The container 8 within the dephlegmator 7 is provided with a wire netting partition 23 just above the neck 9, and upon this is placed a layer of mineral wool, 26, or the like, after which the upper portion of the container is filled with fuller's earth or the like. Manholes 24 and 25 are preferably provided for the purpose of discharging and charging the container 8.

In operating the device to purify the distillates of high-boiling hydrocarbons, it is employed as follows:—Gas oil or other charging stock is cracked or vaporized by any appropriate means, as, for example, by charging the same into still 5, closing the valve in pipe 11 until the desired pressure—five to thirty-five atmospheres or higher—is reached, and then regulating it to maintain the same. The vaporized cracked products enter the dephlegmator and come in contact with and impart heat to the container 8 and the catalyst contained therein. The liquids entrained in the vapors and the heavier portions of the vapors which are condensed in the dephlegmator return to the still through the pipe 10. The vapors pass up and around the container 8 and enter it at the top, passing down through the catalyst and through the wire netting 23 and the neck 9 into the separating chamber 12, and thence by pipe 11 to the condenser 13. The catalyst is thus heated by the vapors before being impregnated by the same, and if exothermic reaction follows such impregnation, both the vapors and the catalyst are additionally heated thereby. The fixed gases go off by pipe 22, and the finished products are collected in liquid form in tank 15. After a period of operation, the catalyst in the container 8 commences to be wetted at the top, due to the formation there of polymers of higher boiling point than the temperature of the entering vapors. This wetness increases progressively toward the bottom of the catalyst as the distillation continues until the polymers pass with the vapors through the neck 9 into the chamber 12. The polymers, being liquid, flow out of the foot of the container 12 into the pipe 16. If it is desired to collect them, the three-way valve may be set to lead them into the pipe 19 and so to the tank 21. Otherwise, they may be returned to the still 5 by pipe 18.

In Fig. 2 I have shown a somewhat modified apparatus adapted to carry out the process. Here the vapor line 36 from the still 35 enters the dephlegmator 37 near the top of the same. The container 38 is sealed at its top to the upper portion of the dephlegmator, so that the only communication between the interior of the dephlegmator 37 and the container 38 is through the restricted neck portion 39 at the foot of the container. The pipe 41 is the vapor line from the container 38 to the condenser not shown. In this figure the vapors passing into the dephlegmator from the pipe 36 pass around the container 38 and to the bottom thereof, and enter through the neck 39 and so come in contact with the heated catalyst within the container 38. The polymers formed in the catalyst within the container 38 drip down through the neck 39, where they join the liquids condensed out of the vapors in the dephlegmator and return to the still 35 through the return pipe 40.

Fig. 3 shows a somewhat modified apparatus in which the vapor pipe 46 from the still 45 introduces the vapors near the foot of the dephlegmator. The container 48 within the dephlegmator is provided with three openings: an inlet opening at the top of the container, a vapor outlet 51 adjacent the bottom of the catalytic material in the container, and a liquid outlet pipe 49 preferably leading to a cooler and tank, not shown, where the polymers formed in the catalyst are collected. The products of condensation in the dephlegmator are returned to the still by the pipe 50 and the treated vapor is conducted through pipe 51 to a condenser (not shown).

In Fig. 4 I have shown a modified apparatus which makes it possible for the vapors to expand as they pass through the catalytic material. Here the vapor line 56 from the still 55 enters the dephlegmator 57 at a point about opposite the lower end of the container or chamber 58. The upper end of the chamber 58 communicates with the interior of the dephlegmator 57 by means of a pipe 60 provided with a valve 61. The container 58 communicates at its lower end by a pipe 59 with a separating chamber 62 which is preferably located within the dephlegmator 57. Pipe 63 is provided to convey the vapors from separating chamber 62 to any suitable condenser not shown. Pipe 64 is adapted to convey the liquids to a polymer tank not shown. The liquids condensed out of the vapors in the dephlegmator 57 are returned to the still 55 through the return pipe 65. In this type of apparatus the valve 61 may be regulated to produce desired pressure within the still and dephlegmator while allowing vapors to pass through the chamber 58 at reduced pressure. Valves 66 and 67 in pipes 63 and 64 respectively may be employed to control the pressure in the chamber 58. During the passage of the vapors through the solid adsorptive material, objectionable, unstable, unsaturated constituents which tend to discolor on exposure to light and to form deposits, are polymerized into compounds of higher boiling point than the vapors. These compounds liquefy and drain out of the solid adsorptive material into the bottom of the treating tower from which they are removed through a trapped conduit. The polymers are thus continuously withdawn from the vicinity of the treating zone and separation of the treated vapors from the polymers is effected. By reference in the claims to the removal of polymers from the vicinity of the treating zone, I mean removal of polymers from the treating tower.

I have found that by the use of my invention in connection with cracking under pressure, I am able to obtain a yield of gasoline condensate which is substantially in excess of the yield of condensate obtained by a similar run under pressure but without using a catalyst. I do not explain this but believe it may be the result of a combination of certain of the uncondensable gases present in the vapors forming new compounds which are condensable under the conditions existing. But whether the invention be used with pressure or without pressure, I am able to obtain a yield of condensate of commercial quality in excess of the yield from similar material by the sulphuric acid method of treatment, due to the fact that my method removes only the undesirable constituents, whereas the sulphuric acid method attacks certain of the desirable hydrocarbons as well. My present process is a great improvement over prior processes as it may be used in connection with the existing apparatus of any distillation plant with the requirement of but few additional parts and no additional attention in operation. It obviates the necessity for large expenditure for machinery and equipment and produces a product that is better than has heretofore been commercially achieved.

While I have described my invention by reference to a number of different forms of apparatus in which it may be employed, I do not intend to be limited to such apparatus as it will be apparent to those skilled in the art that many changes and modifications may appropriately be made in the form and arrangement of apparatus without departure from the substance of my invention which is defined in the appended claims.

By the words "solid adsorptive catalyst", "solid adsorptive material", "adsorptive catalyst", "adsorptive catalyst material" and "catalytic agent" as used in the appended claims, I intend to include only materials of that class which are capable of selectively polymerizing objectionable, unstable, unsaturated constituents of cracked hydrocarbon vapor which tend to discolor on exposure to light and to form deposits.

What I claim as new and desire to secure by Letters Patent is:—

1. The method of refining petroleum distillate containing unstable unsaturated compounds which consists in first passing said distillate in vapor phase around a solid adsorptive catalyst in indirect heat exchange relation therewith, thereby maintaining the catalyst substantially at the temperature of the vapors, then passing the vapors through the catalyst to polymerize the unstable unsaturated compounds, continuously draining from said catalyst condensate formed therein, then separating the vapors from the liquid and subsequently condensing the vapors.

2. The method of refining cracked hydrocarbons containing unstable unsaturated compounds which consists in passing said hydrocarbons in vapor form through an adsorptive catalyst capable of producing polymerization of the unstable unsaturated compounds, as a separate step circulating said vapors around the catalyst in heat interchange relation therewith to maintain the temperature thereof at substantially the temperature of the vapors, continuously draining from said catalyst the condensate comprising polymers, then separating the vapors from the said condensate and subsequently condensing the vapors.

3. The method of accelerating polymerization of the undesirable constituents of cracked hydrocarbons whch consists in passing the said cracked hydrocarbons in vapor form around a body of adsorptive catalytic material and in heat interchange relation therewith, removing the resultant condensate, passing the remaining vapors into contact with and through the catalytic material and continuously removing from said catalytic material condensate comprising polymers formed therein.

4. The method of producing refined low boiling hydrocarbon products from hydrocarbon compounds of higher boiling point which consists in distilling the higher boiling hydrocarbons under cracking pressure, dephlegmating the vapors thus produced, passing said vapors into contact with and through an adsorptive catalyst capable of polymerizing such vapors, using the heat of the vapors in the dephlegmator, without contact between the vapors and the catalyst, to heat the latter, and continuously draining from said catalyst the condensate comprising resulting polymers formed therein.

5. The method of producing refined hydrocarbon products from hydrocarbon compounds of high boiling point which consists in distilling said compounds under superatmospheric pressure, passing the vapors of distillation while still under superatmospheric pressure into heat exchange relation with a body of solid adsorptive material and then passing such vapors under reduced pressure into contact with and through said material.

6. The method of obtaining relatively refined products from cracked hydrocarbon vapors containing unsaturated unstable compounds by continuous treatment during the efficient life of a catalytic agent, which consists in passing said vapors through said catalytic agent while the same is heated substantially to the temperature of the vapors under treatment by circulating said vapors around it in indirect heat exchange relation therewith, then separating the polymers formed in the catalytic agent from vapors passing through the same, draining polymers from the catalytic agent, and continuing to separate and remove polymers until the catalytic agent becomes spent.

7. The process of producing motor fuel, substantially free from unstable compounds which tend to discolor on exposure to light and to form deposits, including those lying within the boiling range of the desirable constituents of such motor fuel, from cracked hydrocarbon distillates from which the heavier constituents have been removed, which process consists in polymerizing and substantially removing from the distillate such unstable compounds by continuously passing said distillate in vapor phase into intimate contact with a body of adsorptive catalytic material, continuously draining from said material and removing from the vicinity of the treating zone condensate comprising resulting liquid polymers formed therein to permit contact between said material and succeeding portions of vapor during the efficient life of said material, continuously removing refined vapors from said material and separating them from the said liquid polymers, and separately condensing the refined vapors.

8. The process of producing motor fuel, substantially free from unstable compounds which tend to discolor on exposure to light and to form deposits, including those lying within the boiling range of the desirable constituents of such motor fuel, which consists in polymerizing and effectively removing such unstable compounds from vaporized cracked hydrocarbons by continuously passing the vaporized hydrocarbons through a body of adsorptive catalytic material under such conditions of temperature as to cause condensation of the resulting polymers while allowing the remaining vapors to pass through substantially uncondensed, continuously draining condensate comprising resulting polymers from said catalytic material during the efficient life thereof and removing the same from the vicinity of the treating zone, continuously removing refined vapors from said material and separating them from the said condensate, and separately condensing the refined vapors.

9. In the process of producing motor fuel substantially free from unstable constituents which tend to discolor on exposure to light and to form deposits, from heavy hydrocarbon oil which has been cracked and the cracked vapors dephlegmated to free them of the heavier fractions, the steps of continuously refining the remaining vapors which consist in passing them in vapor phase through a bed of fuller's earth, thereby polymerizing such unstable compounds, continuously draining from the bed of fuller's earth and removing from the vicinity of the treating zone condensate comprising resulting liquid polymers formed in said bed to permit contact between the fuller's earth and succeeding portions of the vaporized fractions during the efficient life of the fuller's earth, continuously removing refined vapors and separately condensing said refined vapors.

10. In a continuous process of producing substantially color-stable motor fuel from cracked hydrocarbon vapors containing unstable unsaturated compounds from which high boiling constituents have first been removed, the step of contacting the remaining vapors with a body of solid adsorptive catalyst in sufficient quantity to polymerize substantially all of the compounds therein that tend to discolor on exposure to light and to form deposits, including those lying within the boiling range of the desired constituents of said vapors, maintaining the catalyst at a temperature such as to liquefy the resulting polymers, continuously draining condensate comprising resulting liquefied polymers from the catalyst and removing the same from the vicinity of the treating zone, continuously removing refined vapors and separately condensing said refined vapors.

11. The continuous method of refining hydrocarbon vapors containing unstable unsaturated compounds which consists in passing the vapors in a downward stream through a body of solid adsorptive catalyst, thereby polymerizing unstable compounds therein that tend to discolor on exposure to light and to form deposits, maintaining the catalyst at a temperature such as to condense the polymers so formed, continuously draining liquid polymers from the catalyst with the help of said vapor stream to permit continuous contact action between the catalyst and successive portions of the vapors during the efficient life of the catalyst, continuously removing refined vapors and separately condensing said refined vapors.

12. The method of producing refined hydrocarbon fractions from hydrocarbon compounds of higher boiling point which have been distilled under super-atmospheric pressure and from which the condensate of the higher boiling point vapors of such distillation have been removed, the steps of passing the remaining vapors while still under super-atmospheric pressure in a downward stream through a solid adsorptive catalyst thereby polymerizing unstable compounds therein that tend to discolor on exposure to light and to form deposits, continuously draining liquid polymers from the catalyst with the help of the vapor stream, thereby permitting continuous contact action between the catalyst and succeeding portions of the vapors during the efficient life of the catalyst, continuously removing refined vapors from said material and separating them from the said liquid polymers, and separately condensing the refined vapors.

13. The continuous method of obtaining substantially color-stable motor fuel from distillates produced by cracking high boiling hydrocarbons under super-atmospheric pressure and from which the higher boiling constituents have been removed by dephlegmation which consists in polymerizing and removing therefrom substantially all unstable compounds that tend to discolor on exposure to light and to form deposits, by passing said cracked distillates in vapor phase while still under super-atmospheric pressure through a body of solid adsorptive material, continuously draining from said material and removing from the vicinity of the treating zone condensate comprising resulting liquid polymers formed therein, continuously removing refined vapors and separately condensing said refined vapors.

14. In the production of motor fuel, substantially free from unstable compounds which tend to discolor on exposure to light and to form deposits, from cracked hydrocarbons by passing them in vapor phase through a body of solid adsorptive catalyst, the method for rendering such treatment continuous during the efficient life of the catalyst which consists in continuously draining condensate comprising resulting polymers, created by the reaction, from said catalyst and removing the same from the vicinity of the treating zone, continuously separating the refined vapors from said catalyst and said condensate and separately condensing said refined vapors.

15. The process of obtaining substantially color-stable motor fuel from cracked distillate which comprises removing the heavier constituents from the distillate, passing the remainder in vapor form through a body of adsorptive catalytic material to polymerize unstable unsaturated compounds present in such vapor, regulating the temperature of the catalytic material to effect condensation of the polymers thus formed, thereby substantially freeing the vapors of compounds tending to discolor on exposure to light and to form deposits, continuously draining condensate comprising resulting polymers from said material and removing the same from the vicinity of the treating zone to permit continuous contact between such material and succeeding portions of vapor during the effective life of such material, continuously removing refined vapors from said material and separating them from the said condensate and separately condensing the refined vapors.

16. The method of refining cracked hydrocarbons containing unstable unsaturated compounds which consists in passing said hydrocarbons in vapor form through an adsorptive catalyst capable of producing polymerization of the unstable unsaturated compounds, as a separate step circulating said vapors around and in heat exchange relation with the catalyst to maintain the temperature thereof at substantially the temperature of the vapors, preventing the submergence of the catalyst by continuously removing condensate comprising resulting polymers formed therein, then separating the refined vapors from the condensate and subsequently condensing the vapors.

17. In a continuous process of obtaining substantially color-stable motor fuel from cracked hydrocarbon vapors containing unstable unsaturated compounds from which high boiling constituents have first been removed, the step of contacting the remaining vapors with a body of solid adsorptive material in sufficient quantity to polymerize substantially all of the compounds therein that tend to discolor on exposure to light and to form deposits, including those lying within the boiling range of the desired constituents of said vapors, maintaining the material at a temperature such as to liquefy said polymers, preventing the submergence of the material by continuously removing liquid polymers formed therein, continuously draining from said material and removing from the vicinity of the treating zone condensate comprising resulting refined vapors, and separating and condensing the latter.

In testimony whereof, I have signed my name to this specification.

THOMAS T. GRAY.

CERTIFICATE OF CORRECTION.

Patent No. 1,759,812.                                     Granted May 20, 1930, to

THOMAS T. GRAY.

It is hereby certified that error appears in the printed specification of the above numbered patent requiring correction as follows: Page 5, line 90, claim 2, after the word "polymers" insert the words "formed therein"; page 7, claim 17, line 100, beginning with the word "removing" strike out all to and through the word "resulting" in line 104, and insert instead "draining from said material and removing from the vicinity of the treating zone condensate comprising resulting liquid polymers formed therein, continuously removing"; and that the said Letters Patent should be read with these corrections therein that the same may conform to the record of the case in the Patent Office.

Signed and sealed this 24th day of June, A. D. 1930.

(Seal)                                                                           M. J. Moore,
                                                                            Acting Commissioner of Patents.